UNITED STATES PATENT OFFICE.

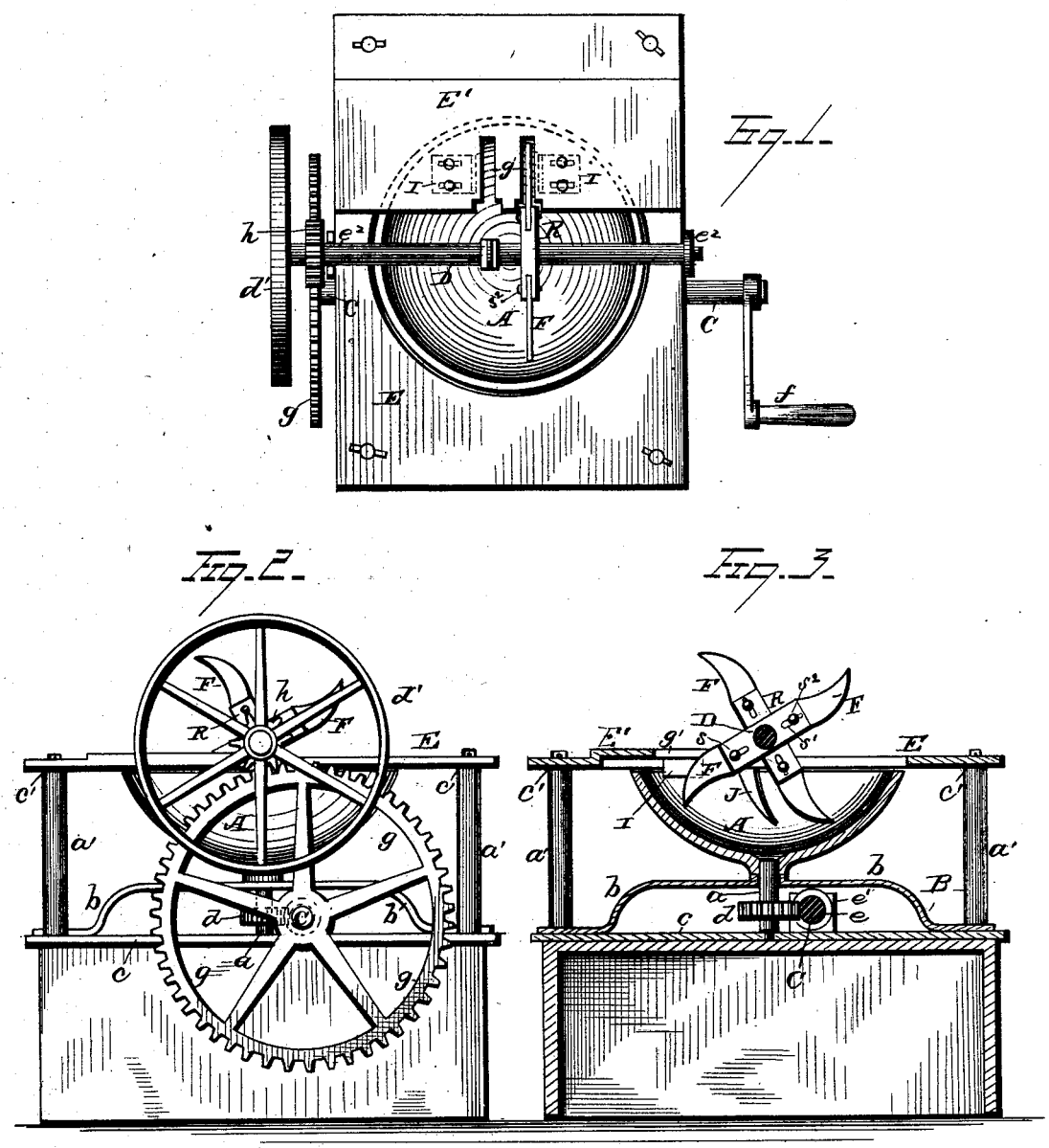

ANDREW A. NORMAN, OF CORNING, IOWA, ASSIGNOR OF ONE-HALF TO GEORGE A. AVRILL, OF SAME PLACE.

MINCING-MACHINE.

SPECIFICATION forming part of Letters Patent No. 244,924, dated July 26, 1881.

Application filed April 19, 1881. (No model.)

*To all whom it may concern:*

Be it known that I, ANDREW A. NORMAN, of Corning, in the county of Adams and State of Iowa, have invented certain new and useful Improvements in Mincing-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in machines for mincing meat and vegetables; and it consists in the construction and arrangement of the different parts, as will be more fully explained, and pointed out in the claim.

In the accompanying drawings, Figure 1 is a plan view of my improved machine. Fig. 2 is a side view, and Fig. 3 a section, of same.

A represents the rotating bowl, supported on the vertical shaft $a$ in the frame B, and brace $b$. This brace $b$ is secured at its ends to the base-plate $c$, and is curved upward at the center, which forms a bearing for the upper part of shaft $a$ and the under side of bowl A. The shaft $a$ is provided with a worm-wheel or pinion, $d$, which meshes with the worm $e$ on the shaft C, said shaft, worm-wheel, and worm being situated between the base-plate $c$ and brace $b$. The shaft C is journaled in the bearings $e'$ on base-plate $c$, and is provided at one end with a crank, $f$, and at the opposite end with a large gear-wheel, $g$, which meshes with a smaller wheel, $h$, on shaft D. This shaft D is journaled in the bearings $e^2$ on upper plate, E, the latter having a semicircular opening over the bowl A, through which the substance to be minced is introduced, and a plate fitting over the remaining portion of the bowl, having slits or openings, through which the knives F pass at every revolution. The upper plate, E, is supported up even with the top of bowl A by four upright standards, $a'$. These standards are firmly secured to the base-plate at their lower ends, and are provided with shoulders $c'$ near their top, on which the upper plate, E, rests, and is removably secured thereto by nuts or pins passing through the upper ends of standards $a'$, thereby allowing the plate E to be removed for the purpose of cleaning the interior of the bowl A. The shaft D rests immediately over the center of the bowl, and is provided with a fly-wheel, $d'$, on one end thereof, and a bearing-plate, R, removably secured on the center of said shaft, onto which the knives F are secured. This plate R is provided with arms $s$ radiating therefrom, having flanges formed on its side to prevent the displacement of the knives, and oblong slots $s'$, through which a bolt, $s^2$, passes and secures the said knives in position; or, instead of the above, the knives can have two cutting-edges and fit directly over a removable angular bearing, and be secured thereon by collars or pins, which will prevent all lateral movement. The bowl is partly covered, as before described, by the upper plate, E', which has the slits through which the knives work. This portion of the upper plate may be made separate from the remaining portion, and adjustably secured thereon, so that the whole surface of the bowl can be exposed, when desired. To the under side of this upper plate, E', and on one or both sides of the slit $g'$, I secure adjustable knives I, with their cutting-edges downward. These knives are provided with an oblong slot in their shanks, through which a thumb-screw from the plate E' passes and holds the cutters in position for assisting the knives F in cutting, and also cleans said knives F at each revolution. These cutters can be adjusted nearer to or farther from the slits $g'$, as desired. To the under side of this plate a scraper, J, is secured, which passes downward and rests slightly above the bowl at one side. As the bowl revolves, the scraper causes the meat or substance being minced which has collected and adhered to the sides of the bowl by the action of the rapidly-revolving cutters to be detached therefrom and fall to the center of the bowl, where it is exposed to the action of the knives.

A mincing-machine constructed according to the above description is simple in construction, easily operated, and of small initial cost in manufacture, as it only requires one shaft carrying one set of knives, which operate directly over the center of the bowl. It is only necessary, in the present instance, to make the concave surface of the bowl of such form that the knives F will move with their cutting-faces slightly above the interior surface of the bowl throughout the whole revolution of the knives, which causes all the particles to be thoroughly minced as the bowl revolves.

Having fully described my invention, what I claim as new, and desire to secure by Letters Patent, is—

In a mincing-machine, the combination, with a rotary bowl formed with a semi-spherical inner surface, of a shaft located over the center of the bowl, and knives secured to said shaft, said knives being constructed and arranged to move concentric with the inner surface of the bowl on opposite sides of its center, substantially as set forth.

In testimony that I claim the foregoing I have hereunto set my hand this 4th day of April, 1881.

ANDREW A. NORMAN.

Witnesses:
C. D. KASSON,
J. A. LOVEJOY.